United States Patent
Vedders

(10) Patent No.: US 7,284,636 B2
(45) Date of Patent: Oct. 23, 2007

(54) ACCELERATED WEIGHT DROP FOR USE AS A SEISMIC ENERGY SOURCE AND A METHOD OF OPERATION THEREOF

(75) Inventor: Clinton R. Vedders, Princeton, MN (US)

(73) Assignee: United Service Alliance, Inc., Texas City, TX (US)

(*) Notice: Subject to any disclaimer, the term of this patent is extended or adjusted under 35 U.S.C. 154(b) by 428 days.

(21) Appl. No.: 10/770,938

(22) Filed: Feb. 3, 2004

(65) Prior Publication Data

US 2005/0167185 A1   Aug. 4, 2005

(51) Int. Cl.
*G01V 1/147* (2006.01)
*G01V 1/24* (2006.01)
*G01V 1/46* (2006.01)

(52) U.S. Cl. ............... 181/121; 181/101; 181/114

(58) Field of Classification Search ........... 181/121, 181/111, 112, 122, 114; 248/569, 574, 602
See application file for complete search history.

(56) References Cited

U.S. PATENT DOCUMENTS

| | | | | |
|---|---|---|---|---|
| 4,284,165 A | * | 8/1981 | Airhart et al. ........... 181/119 |
| 4,354,572 A | | 10/1982 | Martin ................... 181/116 |
| 4,402,381 A | * | 9/1983 | Airhart ................... 181/114 |
| 4,655,314 A | * | 4/1987 | Airhart ................... 181/113 |
| 4,747,466 A | | 5/1988 | Jaworski ................. 181/120 |
| 4,799,572 A | * | 1/1989 | Airhart ................... 181/114 |
| 4,867,266 A | | 9/1989 | Martin ................... 181/106 |
| 4,967,870 A | * | 11/1990 | Airhart ................... 181/121 |
| 4,980,874 A | | 12/1990 | Justice, Jr. .............. 367/190 |
| 4,991,685 A | * | 2/1991 | Airhart ................... 181/106 |
| 5,154,254 A | * | 10/1992 | Thompson et al. ........ 181/121 |
| 5,483,026 A | * | 1/1996 | Hasbrouck et al. ....... 181/121 |
| 6,419,044 B1 | | 7/2002 | Tite et al. ............... 181/116 |
| 6,648,097 B2 | | 11/2003 | Tite et al. ............... 181/116 |
| 2003/0127227 A1 | * | 7/2003 | Fehr et al. .............. 166/306 |
| 2003/0201101 A1 | * | 10/2003 | Kostrov et al. .......... 166/249 |

* cited by examiner

*Primary Examiner*—Lincoln Donovan
*Assistant Examiner*—Jeremy Luks
(74) *Attorney, Agent, or Firm*—Baker Botts L.L.P.

(57) ABSTRACT

The present invention provides an accelerated weight drop for use as a seismic energy source, a method for operating an accelerated weight drop for use as a seismic energy source, and a seismic survey system including the accelerated weight drop. The accelerated weight drop, among other elements, may include a striker positionable over a surface, and a compressed gas spring configured to drive the striker toward the surface thus creating seismic waves within the surface. In this embodiment the striker is slidably coupled to the compressed gas spring.

42 Claims, 6 Drawing Sheets

ACCELERATED WEIGHT DROP FOR USE AS A SEISMIC ENERGY SOURCE AND A METHOD OF OPERATION THEREOF

TECHNICAL FIELD OF THE INVENTION

The present invention is directed, in general, to a seismic energy source and, more specifically, to an accelerated weight drop for use as a seismic energy source, a method of manufacture therefor, and a seismic survey system including the accelerated weight drop.

BACKGROUND OF THE INVENTION

Seismic geophysical surveys are used in petroleum, gas mineral and water exploration to map the following: stratigraphy of subterranean formations, lateral continuity of geologic layers, locations of buried paleochannels, positions of faults in sedimentary layers, basement topography, and others. Such maps are deduced through analysis of the nature of reflections and refractions of generated seismic waves from interfaces between layers within the subterranean formation.

A seismic energy source is used to generate seismic waves that travel through the earth and are then reflected by various subterranean formations to the earth's surface. As the seismic waves reach the surface, they are detected by an array of seismic detection devices, known as geophones, which transduce waves that are detected into representative electrical signals. The electrical signals generated by such an array are collected and analyzed to permit deduction of the nature of the subterranean formations at a given site.

Seismic energy sources that have been used in geophysical survey methods for petroleum, gas, copper, coal, diamond and other mining exploration operations include explosives, vibratory sources and impact sources. The nature of output seismic energy depends on the type of seismic energy source that was used to generate it.

Explosive seismic energy sources used in petroleum and gas exploration on land rely on the explosion of material placed within a subterranean formation to generate seismic waves. Typically, a hole is drilled in the ground, the explosive is placed in the hole, and backfill is piled on top of the explosive, prior to initiating the explosion. Compared on a pound for pound basis to other energy sources, explosive sources impart a very high amount of seismic energy into the ground. Explosive seismic energy sources currently being used in geophysical survey methods generally produce waves of very high frequency.

Many explosives used in seismic energy sources generate high gas volumes. This is a useful property in mining for moving rock, but is undesirable in seismic exploration, because it decreases the amount of usable seismic energy that is generated. Explosives that produce high volumes of gas cause much of the energy of the explosion to be lost as expanding gases force backfilled material up the borehole into which the explosive was placed. Thus, less of the energy generated by the explosion is transferred into the subterranean formation than would be theoretically possible if less energy was lost to the expansion of generated gases. Further, as the explosives are considered bombs in certain countries, their use is severely limited.

Vibratory sources are also used as seismic energy sources in geophysical survey methods. Two categories of vibratory sources include those that generate seismic waves originating at the surface and those that generate seismic waves that emanate from downhole. One mechanical-hydraulic vibratory source, the Vibroseis truck, is specially designed to place all of its weight onto a large platform which vibrates. This vibration, in turn, produces seismic waves in the subterranean formation. Vibroseis trucks have been used extensively in geophysical survey methods, not just for the petroleum and gas exploration, but also for studying the evolution and development of specific geological structures (e.g., the Rocky Mountains) and fault lines. Vibratory sources tend to produce highly repeatable seismic energy. The nature of the energy delivered into the ground by vibratory sources, its amount, duration, and time of delivery, can be tightly controlled and therefore the seismic energy generated tends to be very reproducible, which is a benefit. However, vibratory sources are often not suited to certain types of terrain. For example if the ground is very soft, it can be difficult to use Vibroseis trucks as a seismic energy source.

Fundamentally, an impact source is a weight striking the surface of the earth directly or impacting a plate placed on the earth's surface, yielding seismic energy. A weight-drop is an example of the former type of impact source. Impact sources tend to be relatively inexpensive, and simple to operate and maintain. Additionally, they do not bring about many of the disadvantages associated with the former two impact sources. Unfortunately, their principal disadvantage is that they are inefficient at continuously producing seismic energy useful for geophysical survey of deeper layers. Impact sources typically tend to yield a relatively high proportion of low frequency, surface waves and output less seismic energy than other seismic energy sources.

Accordingly, there is a need in the art for improved seismic methods and geophysical survey systems that rely on impact sources that convert a higher amount of the potential energy in the impact source into seismic energy.

SUMMARY OF THE INVENTION

To address the above-discussed deficiencies of the prior art, the present invention provides an accelerated weight drop for use as a seismic energy source, a method for operating an accelerated weight drop for use as a seismic energy source, and a seismic survey system including the accelerated weight drop. The accelerated weight drop, among other elements, includes a striker positionable over a surface, and a compressed gas spring configured to drive the striker toward the surface, thus creating seismic waves within the surface. In this embodiment the striker is slidably coupled to the compressed gas spring.

As indicated above, the present invention further provides a method for operating an accelerated weight drop for use as a seismic energy source. The method for operating the accelerated weight drop includes positioning a striker over a surface and driving the striker toward the surface using a compressed gas spring to create seismic waves within the surface, wherein the striker is slidably coupled to the compressed gas spring.

The present invention further provides a seismic survey system. Without being limited to such, the seismic survey system includes: 1) an accelerated weight drop, as described above, 2) at least one geophone placed proximate the surface, wherein the geophone is configured to collect information from the seismic waves, and 3) a seismic recorder connected to the at least one geophone, the seismic recorder configured to record the collected information.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
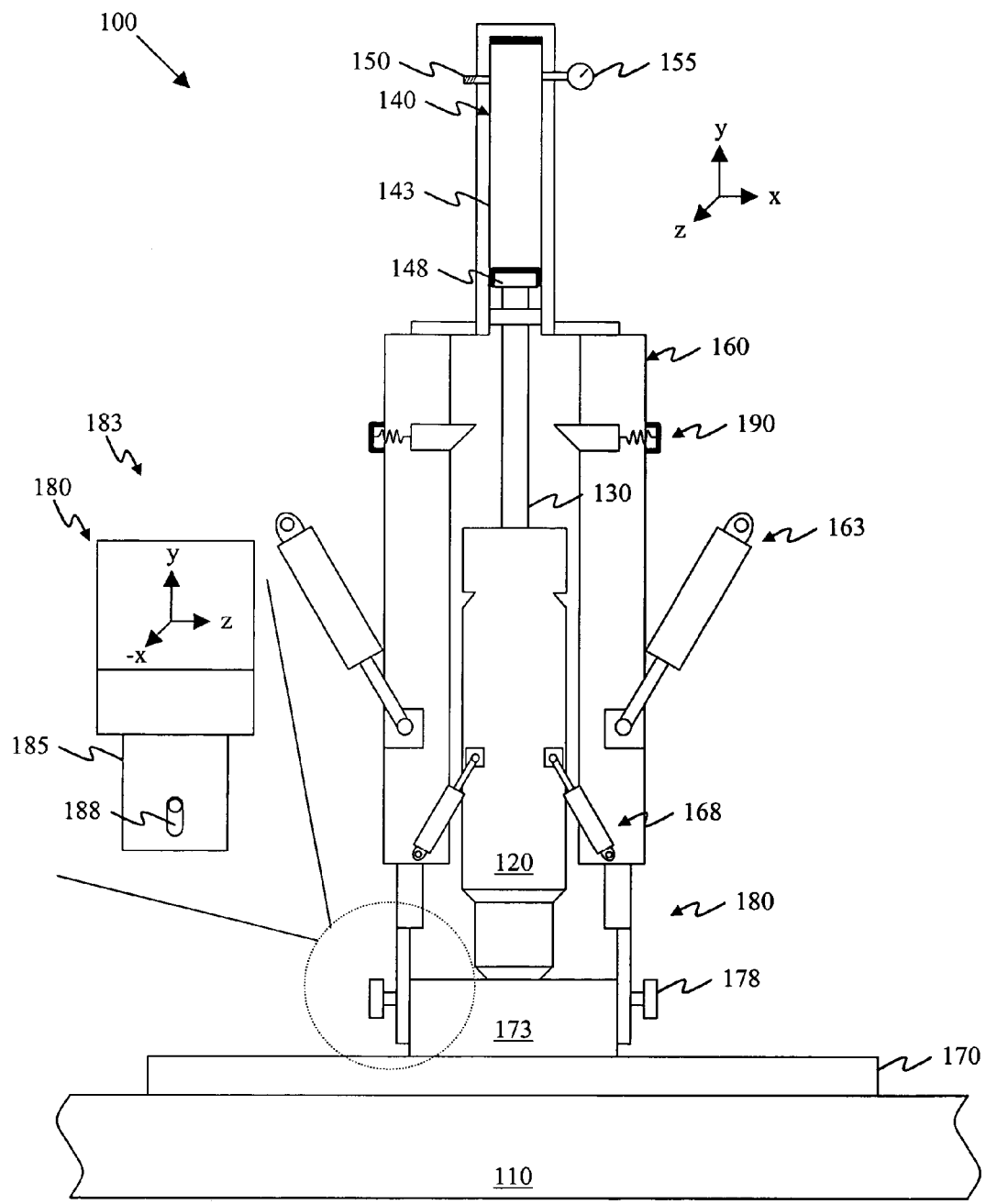
FIG. 1 illustrates a cross-sectional view of one embodiment of an accelerated weight drop for use as a seismic energy source constructed in accordance with the principles of the present invention.

Referring initially to FIG. 1 illustrated is a cross-sectional view of one embodiment of an accelerated weight drop 100 for use as a seismic energy source constructed in accordance with the principles of the present invention. The accelerated weight drop 100 illustrated in FIG. 1 includes a striker 120 positionable over a surface 110. The surface 110, as one skilled in the in the art of seismic geophysical surveys could imagine, might comprise a number of different surfaces while staying within the scope of the present invention. For example, the surface 110 may comprise soil itself, or in another embodiment might comprise a rigid surface coupled to the soil, such as a cement footing or another similar rigid surface. The rigid surface might be beneficial in loose soil conditions, such as sand, as might be found in petroleum or gas fields throughout the United States or world. Similarly, the surface 110 may comprise both horizontal and vertical surfaces, as well as anything in-between.

The striker 120, which may consist of a hammer like design, is typically a very heavy structure. For example, in one embodiment of the invention the striker has a weight that ranges from about 1000 pounds to about 2500 pounds. This weight, however, may easily be changed or tailored to meet a specific purpose. For instance, where a surface 110 needs a larger seismic energy source than might be provided using the above-referenced 1000 pound to 2500 pound striker 120, the weight of the striker 120 could be increased to accommodate the desired, larger seismic energy source. Similarly, a smaller and more mobile striker 120 could be used in an accelerated weight drop 100 that is configured to be carried and used in a mining shaft by individuals. In such a circumstance a striker 120 weighing between about 25 pounds and about 100 pounds could be used. Given the multiple number of uses for the accelerated weight drop 100, the present invention should not be limited to any specific striker 120 weight.

The striker 120, in the embodiment shown in FIG. 1, comprises an eight-inch diameter cylindrical piece of hardened steel. The diameter, as well as the geometric configuration and the material chosen to form the striker 120, however, could be changed to accommodate the various weights discussed above. In the illustrated embodiment, the striker 120 has a substantially flat surface. This allows the striker 120 to easily transfer its impact load to a contacted surface.

The striker 120, through the use of a push rod 130, is slidably coupled to a compressed gas spring 140. The push rod 130 may be any structure capable of connecting the striker 120 to the compressed gas spring 140, and stay within the scope of the present invention. Nonetheless, in the embodiment shown in FIG. 1 the push rod 130 comprises a 2-3 inch diameter steel rod having a material strength sufficient to handle any forces transferred to or from the striker 120.

The compressed gas spring 140, which is configured to drive the striker 120 toward the surface 110, includes a gas chamber 143 and a piston 148. As is illustrated, the piston 148 is configured to slide within the gas chamber 143 to create a pressure therein. This pressure, in turn, will uniquely be used to assist the drive of the striker 120 toward the surface 110 at a high rate of speed.

Both the gas chamber 143 and the piston 148 may comprise conventional materials for their manufacture. As an example, most of the materials used to manufacture the accelerated weight drop 100 could be purchased at any standard steel yard, and if required, could be assembled and tailored where needed by any skilled machinist, given the teachings herein. The gas chamber 143 in the embodiment of FIG. 1 comprises a three-inch diameter bulk pipe having a length of about 29 inches, and an upper surface closed to the atmosphere.

Optionally coupled to the gas chamber 143 is a charging port 150. The charging port 150, which might be a standard air chuck similar to that used on an automobile tire, is configured to charge the gas chamber 143 before, during or after using the accelerated weight drop 100. In an exemplary embodiment, the charging port 150 is used to add nitrogen gas to the gas chamber 143. While any known or hereafter discovered compressible gas could be used to create the pressure within the gas chamber 143, nitrogen gas is very useful as it does not contain the moisture and particulate matter commonly contained within atmospheric air. Additionally, nitrogen is safe to handle and relatively inexpensive to use.

Also, optionally coupled to the gas chamber 143 in the embodiment of FIG. 1 is a pressure gauge 155. As one skilled in the art would expect, the pressure gauge 155 may be used to observe a pressure within the gas chamber 143 before, during or after use of the accelerated weight drop 100. Given this pressure, a calculation means could be used to calculate an impact load that might be placed upon the surface 110 by the striker 120.

Coupled to the compressed gas spring 140 and at least partially surrounding the striker 120 may be a housing 160. The housing 160 acts as a manifold or guide for the striker 120. In the advantageous embodiment shown and discussed with respect to FIG. 1, the housing 160 consists of a conventional 10 inch diameter 6 foot long piece of bulk pipe at least partially surrounding the striker 120. The housing 160 may further include a 12 inch by ⅜ inch channel iron that is approximately 6 foot long coupled to the bulk pipe. This channel iron allows other devices, such as a hydraulic press 163 for transferring a static load to the housing 160 or a hydraulic lift for lifting the striker 120 into a cocked position, to be rigidly or removable coupled thereto. While not shown, an extension of the housing 160 may extend up and around the gas chamber 143. In this instance, a five-inch diameter bulk pipe sheathing is optionally coupled to the housing 160 and surrounding the gas chamber 143. Additionally, welded to the top surface of the sheathing may be a ½ inch thick 5¼ inch diameter cap.

In an exemplary embodiment of the invention, as shown, a strike plate 170 may be positioned between the striker 120 and the surface 110. Specifically, the strike plate 170 in the embodiment of FIG. 1 is movably coupled to the housing 160. The strike plate 170, in this embodiment, is configured to transfer an impact load from the striker 120 to the surface 110, as well as accept a static load from the housing 160. The interplay between the static load and impact load will be discussed further below when discussing how the accelerated weight drop 100 of FIG. 1 might operate.

The strike plate 170 may, in an advantageous embodiment, have an anvil 173 coupled thereto. For example, a high integrity weld could be used to rigidly couple the anvil 173 to the strike plate 170, or alternatively the two structures could be bolted together. In another advantageous embodiment the strike plate 170 and the anvil 173 could comprise a single structure, such as a structure formed in a single manufacturing process. Either of these configurations, or for that matter other configurations not disclosed, are within the scope of the present invention.

Extending from a vertical surface of the anvil 173 are pins 178. The pins 178 may either be welded to the anvil 173 or formed in the same manufacturing process as the strike plate 170, anvil 173, or both the strike plate 170 and the anvil 173. Similarly, the pins 178 could be bolted to the anvil 173. As will be shown below, the pins 173 are a point of transfer of the static load from the housing 160 to the strike plate 170.

An impact isolator 180 may be positioned between the housing 160 and the strike plate 170, and more specifically between the housing 160 and the pins 178 connected to or forming a portion of the strike plate 170. As is shown in the alternate view 183 of the accelerated weight drop 100, the impact isolator 180 may be rigidly coupled to the housing 160 and slidably coupled to the strike plate 170, or pins 178. For instance, in the exemplary embodiment of FIG. 1 the impact isolator 180 comprises a plate 185 having a slot 188 located therein. As can be observed in FIG. 1, the pins 178 are slidably coupled within the slot 188. The importance of the impact isolator 180 will be discussed in detail during the discussion of the method of operating the accelerated weight drop 100.

Uniquely included within the accelerated weight drop 100 is a catch mechanism 190. The catch mechanism 190, which in the embodiment of FIG. 1 happens to be coupled to the housing 160, is designed to hold the striker 120 in a cocked position. Among others, the catch mechanism 190 may comprise a biased dog to hold the striker 120 in the cocked position. The biased dog, such as a trip dog or slide dog, may be configured to cooperatively engage the striker. For instance, the slide dog shown in FIG. 1 is configured to cooperatively engage the notches 125 in the striker 120. Again, it should be understood that the mechanical catch 190 discussed herein is but one example and that one who is skilled in the art would be able to arrive at other catch mechanisms, given the teachings of the present invention.

The accelerated weight drop 100 illustrated in FIG. 1 may contain other features that are also within the scope of the present invention. For example, one important feature of the present invention, which is not shown, is a safety mechanism that prevents the striker 120 from dry firing. The striker 120, when in the transportation mode, should not be fired. Therefore, the safety mechanism prevents the striker 120 from firing if the striker plate 170 is not located on the surface 110, and a static load has not yet been placed on the striker plate 170.

Figure 2:
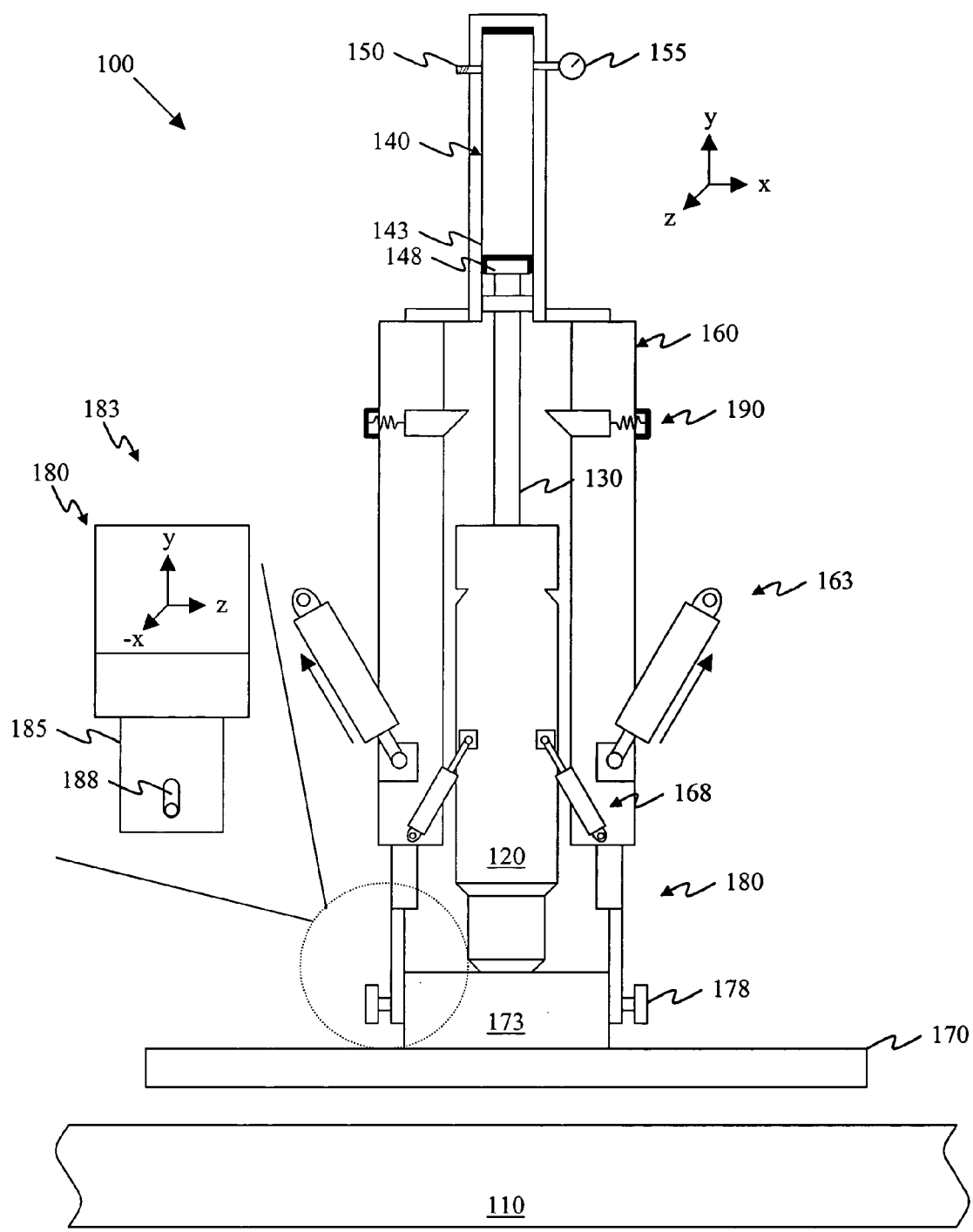
FIGS. 2-5 illustrate simple schematic cross-sectional views illustrating how one might operate an accelerated weight drop manufactured in accordance with the principles of the present invention as a seismic energy source.

Turning now to FIGS. 2-5 illustrated are simple schematic cross-sectional views illustrating how one might operate an accelerated weight drop manufactured in accordance with the principles of the present invention as a seismic energy source. FIG. 2 illustrates an accelerated weight drop 100 in a configuration that might be used for its transportation. For example, in the embodiment of FIG. 2, the hydraulic presses 163 are retracted causing the strike plate 170 to be held a distance off of the surface 110. While it is shown that the strike plate 170 is only held a small distance above the surface 110 when the hydraulic presses 163 are completely retracted, this distance can be increased by changing the throw distance of the hydraulic presses 163. Similarly, devices other than the hydraulic presses 163 could be used to retract the housing 160 and strike plate 170 and stay within the scope of the present invention.

As is noticed in FIG. 2, the pins 178 slide to the lowest portion of the slot 188 when the hydraulic presses 163 are retracted. The pins 178, which are physically connected to the anvil 173 of the strike plate 170, are, therefore, the point at which the strike plate 170 is lifted. This unique feature eliminates the need to have to position the strike plate 170 in place after the accelerated weight drop 100 reaches its desired destination. As a result, the strike plate 170 is self-aligning before and after each set-up.

At this stage, the gas chamber 143 may or may not be charged with the desired gas. Often, the gas chamber 143 always remains charged to some extent or another. In such an instance, the charging port 150 would only be used to recharge the gas chamber 143 after some or all of the gas undesirably escaped therefrom, to add additional gas into the chamber thereby increasing the impact load of the striker 120, or to evacuate the gas chamber 143 to perform service thereon. The pressure gauge 155 could be used to monitor the pressure within the gas chamber 143.

Optionally connected to the gas chamber 143 and a gas source may be a gas monitoring and injection system. For example, a device capable of monitoring the pressure within the gas chamber 143 and maintaining a predetermined pressure within the gas chamber 143 could be used. When the gas monitoring and injection system determines that the gas chamber 143 deviates from the predetermined gas pressure, it injects gas into the gas chamber 143 to restore it to the predetermined pressure. In this instance, the gas chamber 143 could always have the same predetermined pressure, regardless of any small gas leaks that might be present.

Figure 3:
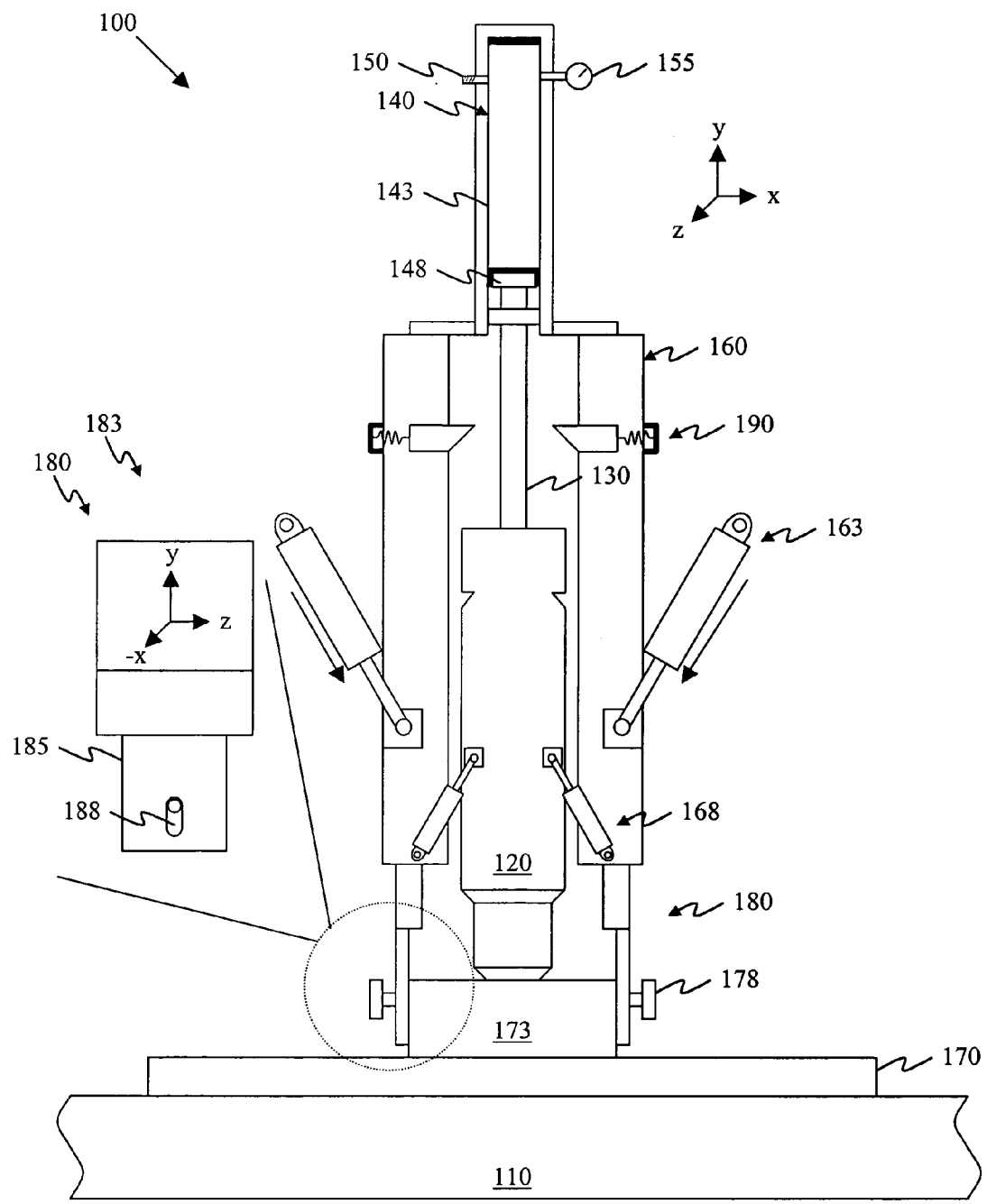

Turning now to FIG. 3, illustrated is the accelerated weight drop 100 illustrated in FIG. 2 after it has been positioned in a desired location and the strike plate 170 placed upon the surface 110. This can be accomplished by extending the hydraulic presses 163, thereby causing the strike plate 170 to approach the surface 110. Further, not only does the extension of the hydraulic presses 163 cause the strike plate 170 to approach the surface 110, the entire weight of the structure (e.g., a static load) may be placed upon the strike plate 170 through the housing 160 and the impact isolator 180. Note how the pins 178 are now located in an upper most portion of the slot 188 in the plate 185. This static load, as will be discussed further below, helps transfer a substantial portion of the impact load directly to the surface 110.

Figure 4:
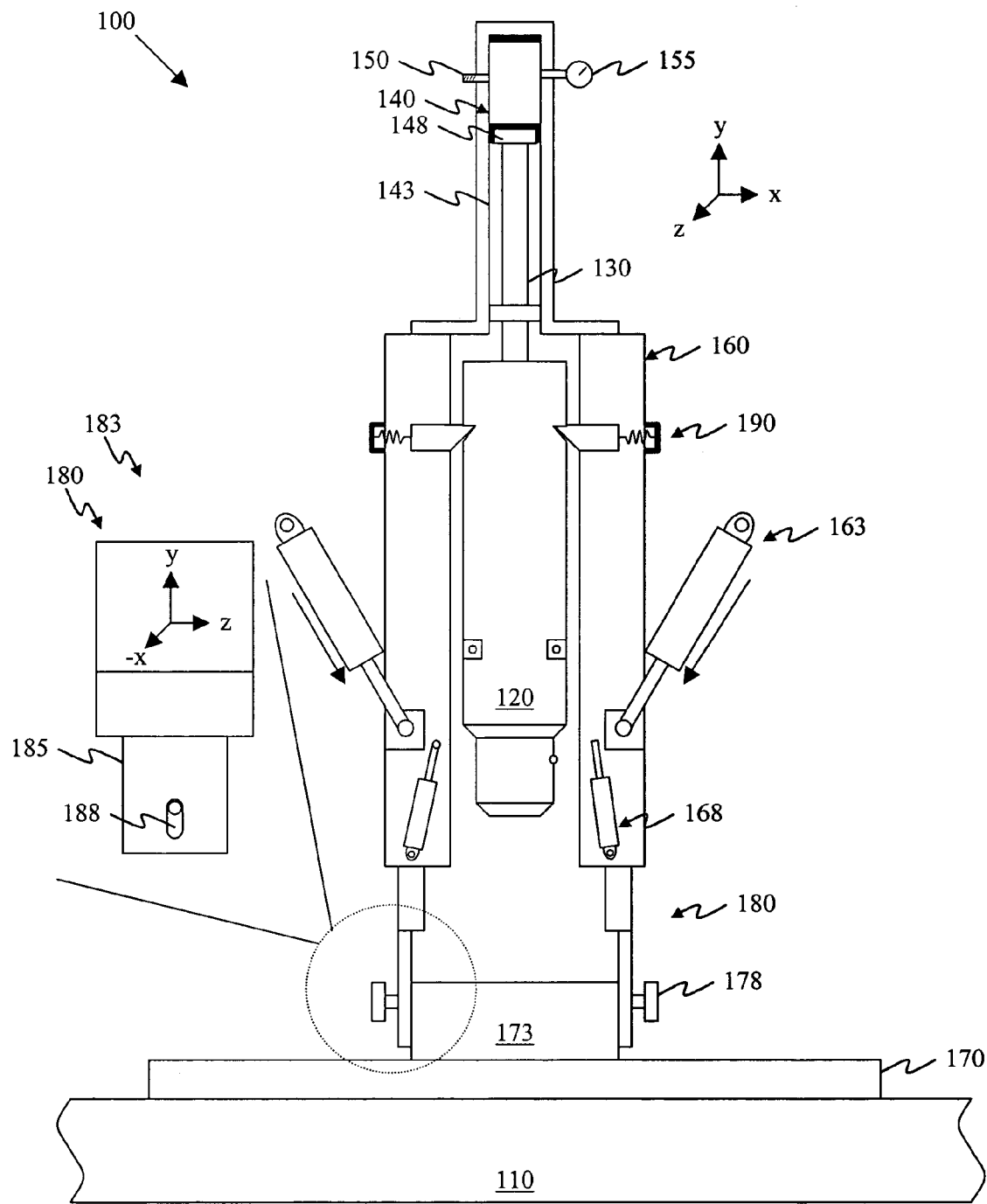

Turning now to FIG. 4, illustrated is the accelerated weight drop 100 of FIG. 3, after the striker 120 has been placed in a cocked position. Unique only to the present invention, the cocking of the striker 120 causes the original volume of the gas chamber 143 to decrease substantially. But for the catch mechanism 190, the decreased volume would tend to cause the striker 120 to drive toward the surface 110, thus creating seismic waves therein. Obviously, however, at this point the catch mechanism 190 would keep the striker 120 in the cocked position.

Any sort of cocking means, such as the hydraulic lift 168 coupled to the striker 120, could be used to lift the striker 120 to a cocked position. While the hydraulic lift 168 is illustrated in FIG. 4 as lifting the striker 120, those skilled in the art understand that any known or hereafter discovered device capable of lifting the striker 120 to a cocked position is also within the scope of the present invention. For example, the lifting mechanism might consist of cooperative ratchet gears or cable and pulley systems used to lift he striker to a cocked position.

If desired, the gas chamber 143 may be further charged using the charging port 150 after the striker 120 has been cocked. As one would expect, the addition of the added gas within the gas chamber 143 would increase the force the striker 120 is capable of delivering to the strike plate 170.

Figure 5:
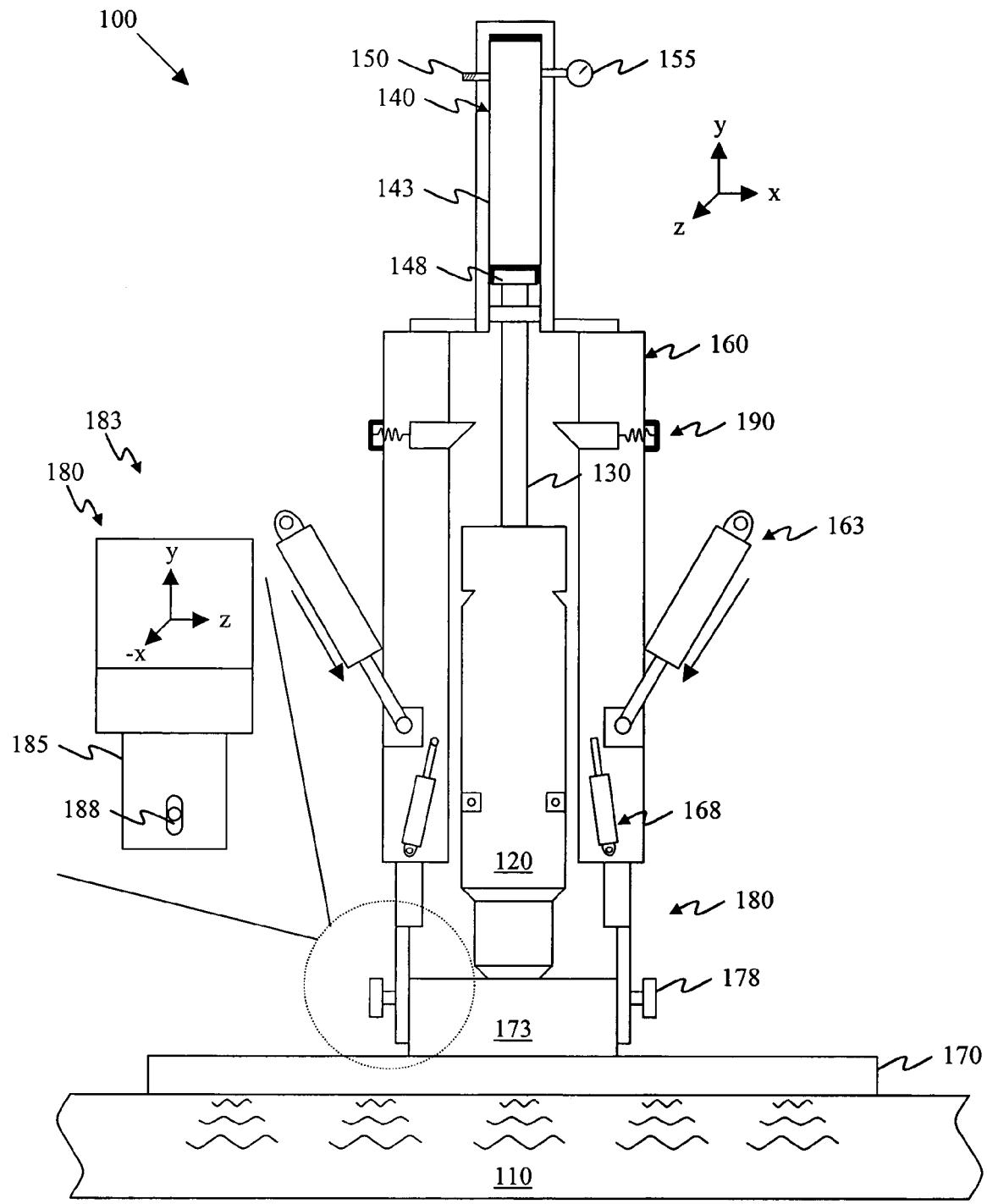

Turning now to FIG. 5, illustrated is the accelerated weight drop 100 illustrated in FIG. 4 after the catch mechanism 190 has been triggered and the striker 120 is contacting the striker plate 170. More specifically, the illustration of FIG. 5 represents a snapshot of a brief moment right after the striker 120 contacts the striker plate 170. At this brief moment the housing 160 is isolated from the pins 178 of the strike plate 170. For example, as is shown in the alternate view 183, the pins 178 are suspended within the slot 188 of the impact isolator 180 at this brief moment. This suspension allows the striker 120 to transfer substantially all of its impact load directly on the strike plate 170 with limited loss of energy being reflected back up the housing 160. This is at least partially a function of the length of the slot 188 being located substantially in line with a line of impact of the striker 120. Further, not only does the impact isolator 180 allow the impact load to be efficiently transferred to the strike plate 170, and thus surface 110, the reduced reflection allows the accelerated weight drop to have a much longer effective lifespan.

By the time the pins 178 spring back up within the slot 188 in the impact isolator 170 as a result of the static load being placed thereon, a majority of the impact load has already been efficiently transferred to the surface 110. Therefore, the reflection to the housing 160 is minimal. A reflection may exist up the striker 120, through the push rod 130 and to the gas chamber 143. For this reason, cushioning devices may be placed proximate the gas chamber 143. These cushioning devices, which might comprise rubber gaskets, may advantageously be placed to absorb this reflected energy.

The accelerated weight drop constructed in accordance with the principles of the present invention provides many of the benefits associated with traditional seismic energy sources without providing their drawbacks. For instance, the accelerated weight drop constructed in accordance with the principles of the present invention is capable of providing a much greater impact load for its size, than could be provided by the prior art accelerated weight drop systems. For this reason, the accelerated weight drop constructed in accordance with the principles of the present invention may be manufactured much smaller than the prior art devices, and therefore, is much easier to operate and move from site to site. Additionally, the accelerated weight drop constructed in accordance with the principles of the present invention does not have the legal constraints associated with using the explosive sources, as well as does not have the placement constraints associated with the vibratory sources.

Figure 6:
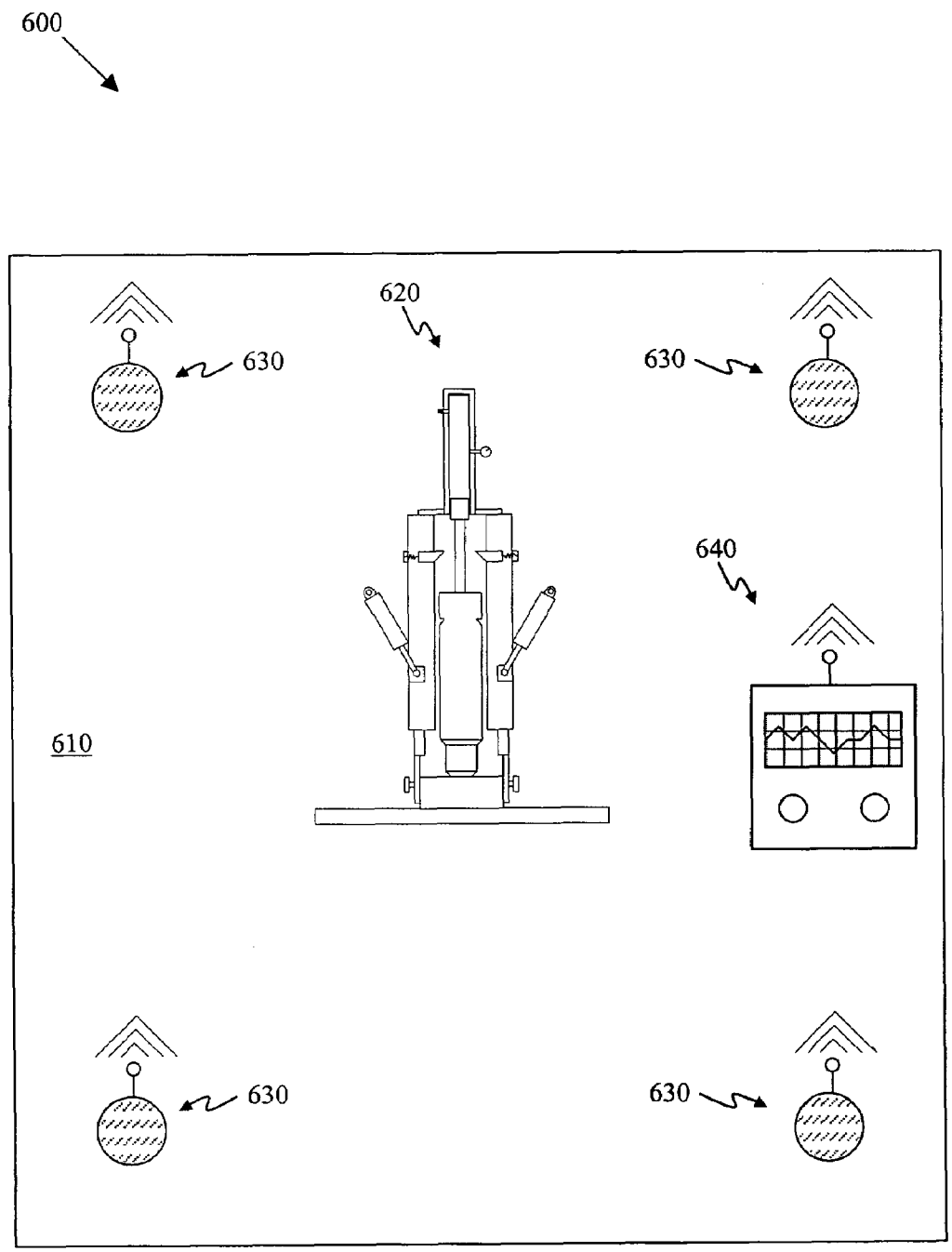
FIG. 6 illustrates a seismic survey system constructed in accordance with the principles of the present invention.

Turning briefly to FIG. 6, illustrated is a seismic survey system 600 constructed in accordance with the principles of the present invention. The seismic survey system 600 illustrated in FIG. 6 initially includes an accelerated weight drop 620, which might be similar to the accelerated weight drop 100 illustrated in FIG. 1, positioned over a surface 610 to create seismic waves therein.

Placed proximate the surface 610 for collecting information from the seismic waves created by the accelerated weight drop 620 is at least one geophone 630. In the embodiment illustrated in FIG. 6, four geophones 630 are being used. Those skilled in the art understand, however, that any number of geophones 630 could be used and stay within the scope of the present invention. Wirelessly connected to the geophones 630 in the embodiment illustrated in FIG. 6 is a seismic recorder 640 configured to record the collected information. I should be noted that the seismic recorder 640 could just as easily been hardwired to the geophones 630.

Although the present invention has been described in detail, those skilled in the art should understand that they can make various changes, substitutions and alterations herein without departing from the spirit and scope of the invention in its broadest form.

What is claimed is:

1. An accelerated weight drop, comprising:
a striker positionable over a surface;
a housing at least partially surrounding the striker;
a driver operatively coupled to the striker and operable to drive the striker toward the surface; and
a plurality of impact isolators, at least two of the impact isolators positioned substantially in line with a line of impact of the striker; wherein the impact isolators are operable to allow the housing to move relative to the surface upon an impact of the striker with the surface.

2. The accelerated weight drop of claim 1, wherein the surface comprises a strike plate.

3. The accelerated weight drop of claim 2, wherein the surface further comprises an anvil disposed between the strike plate and the striker.

4. The accelerated weight drop of claim 1, wherein the impact isolator comprises a member having a slot positioned substantially in line with a line of impact of the striker, and wherein the surface comprises a pin operable to be slidably coupled within the slot.

5. The accelerated weight drop of claim 4, wherein the surface further comprises an anvil disposed between a strike plate and the striker, and wherein the pin is rigidly coupled to the anvil.

6. The accelerated weight drop of claim 1 wherein the driver further comprises a compressed gas spring, wherein the compressed gas spring includes a gas chamber and a piston, wherein the piston is configured to slide within the gas chamber to compress a gas therein to create a pressure that drives the striker toward the surface.

7. The accelerated weight drop of claim 6 further comprising a charging port coupled to the gas chamber, the charging port configured to provide the gas within the gas chamber.

8. The accelerated weight drop of Claim 1, wherein each of the impact isolators is positioned substantially in line with a line of impact of the striker.

9. The accelerated weight drop of claim 1 further including a catch mechanism coupled to the housing and configured to hold the striker in a cocked position.

10. The accelerated weight drop of claim 1 wherein the housing is coupled to a static load and is configured to transfer the static load to the strike plate.

11. The accelerated weight drop of claim 10 further comprising a hydraulic press coupled to the housing, the hydraulic press configured to create the static load.

12. The accelerated weight drop of claim 1 further comprising a hydraulic lift coupled to the striker, the hydraulic lift configured to lift the striker to a cocked position.

13. A method of manufacturing an accelerated weight drop, comprising:
coupling a driver, operable to be driven toward a surface, to a housing, wherein the housing at least partially surrounds the driver;
rigidly coupling a plurality of impact isolators to the housing, at least two of the impact isolators positioned substantially in line with a line of impact of the striker;
slidably coupling the impact isolator to the surface, wherein the impact isolator is operable to allow the housing to move relative to the surface upon an impact of the striker with the surface.

14. The method of claim 13, wherein the surface comprises a strike plate.

15. The method of claim 14, wherein the surface further comprises an anvil disposed between the strike plate and the striker.

16. The method of claim 13, wherein the impact isolator comprises a member having a slot and wherein the surface comprises a pin, and wherein slidably coupling the impact isolator to the surface comprises positioning the pin within the slot substantially in line with a line of impact of the striker.

17. The method of claim 16, wherein the surface further comprises an anvil disposed between a strike plate and the striker and the pin is rigidly coupled to the anvil, and wherein slidably coupling the impact isolator to the surface comprises positioning the pin within the slot substantially in line with a line of impact of the striker.

18. The method of claim 13, wherein the driver further comprises a compressed gas spring, and wherein the compressed gas spring includes a gas chamber and a piston.

19. The method of claim 18, wherein the accelerated weight drop further comprises a charging port coupled to the gas chamber, the charging port configured to provide the gas within the gas chamber.

20. The method of claim 13, wherein each of the impact isolators is positioned substantially in line with a line of impact of the striker.

21. The method of claim 13, wherein the accelerated weight drop further comprises a catch mechanism coupled to the housing and configured to hold the striker in a cocked position.

22. The method of claim 13, wherein the housing is coupled to a static load and is configured to transfer the static load to the strike plate.

23. The method of claim 22, wherein the accelerated weight drop further comprises a hydraulic press coupled to the housing, the hydraulic press configured to create the static load.

24. The method of claim 13, wherein the accelerated weight drop further comprises a hydraulic lift coupled to the striker, the hydraulic lift configured to lift the striker to a cocked position.

25. A seismic survey system, comprising:
a striker positionable over a surface;
a housing at least partially surrounding the striker;
a driver operatively coupled to the striker and operable to drive the striker toward the surface;
a plurality of impact isolators operable to allow the housing to move relative to the surface upon an impact of the striker with the surface, wherein at least two of the plurality of impact isolators comprises a slot positioned substantially in line with a line of impact of the striker;
one or more geophones placed proximate the surface, the one or more geophones configured to collect information from seismic waves created upon an impact of the striker with the surface; and
a seismic recorder connected to the one or more geophones, the seismic recorder configured to record the information collected.

26. The system of claim 25, wherein the surface comprises a strike plate.

27. The system of claim 26, wherein the surface further comprises an anvil disposed between the strike plate and the striker.

28. The system of claim 25, wherein the impact isolator comprises a member having a slot positioned substantially in line with a line of impact of the striker, and wherein the surface comprises a pin operable to be slidably coupled within the slot.

29. The system of claim 28, wherein the surface further comprises an anvil disposed between a strike plate and the striker, and wherein the pin is rigidly coupled to the anvil.

30. The system of claim 25, wherein the driver further comprises a compressed gas spring, wherein the compressed gas spring includes a gas chamber and a piston.

31. The system of claim 30, wherein the accelerated weight drop further comprises a charging port coupled to the gas chamber, the charging port configured to provide the gas within the gas chamber.

32. The system of claim 25, wherein each of the impact isolators is positioned substantially in line with a line of impact of the striker.

33. The system of claim 25, wherein the accelerated weight drop further comprises a catch mechanism coupled to the housing and configured to hold the striker in a cocked position.

34. The system of claim 25, wherein the housing is coupled to a static load and is configured to transfer the static load to the strike plate.

35. The system of claim 34, wherein the accelerated weight drop further comprises a hydraulic press coupled to the housing, the hydraulic press configured to create the static load.

36. The system of claim 25, wherein the accelerated weight drop further comprises a hydraulic lift coupled to the striker, the hydraulic lift configured to lift the striker to a cocked position.

37. An accelerated weight drop, comprising:
a striker positionable over a surface;
a housing at least partially surrounding the striker;
an impact isolator operable to allow the housing to move relative to the surface upon an impact of the striker with the surface, wherein the impact isolator comprises a member having a slot, and wherein the surface comprises a pin operable to be slidably coupled within the slot; and
a driver operatively coupled to the striker and operable to drive the striker toward the surface, wherein the surface comprises a strike plate and an anvil disposed between the strike plate and the striker, and wherein the pin is rigidly coupled to the anvil.

38. The accelerated weight drop of claim 37, wherein the slot is positioned substantially in line with a line of impact of the striker.

39. A method of manufacturing an accelerated weight drop, comprising:
  coupling a driver, operable to be driven toward a surface, to a housing, wherein the housing at least partially surrounds the driver;
  rigidly coupling an impact isolator to the housing, wherein the impact isolator comprises a member having a slot, and wherein the surface comprises a pin operable to be slidably coupled within the slot; and
  slidably coupling the impact isolator to the surface, wherein the impact isolator is operable to allow the housing to move relative to the surface upon an impact of the striker with the surface, and wherein the surface comprises a strike plate and an anvil disposed between the strike plate and the striker, and wherein the pin is rigidly coupled to the anvil.

40. The method of claim 39, wherein the slot is positioned substantially in line with a line of impact of the striker.

41. A seismic survey system, comprising:
  a striker positionable over a surface;
  a housing at least partially surrounding the striker;
  an impact isolator operable to allow the housing to move relative to the surface upon an impact of the striker with the surface, wherein the impact isolator comprises a member having a slot, and wherein the surface comprises a pin operable to be slidably coupled within the slot;
  a driver operatively coupled to the striker and operable to drive the striker toward the surface, wherein the surface comprises a strike plate and an anvil disposed between the strike plate and the striker, and wherein the pin is rigidly coupled to the anvil;
  one or more geophones placed proximate the surface, the one or more geophones configured to collect information from seismic waves created upon an impact of the striker with the surface; and
  a seismic recorder connected to the one or more geophones, the seismic recorder configured to record the information collected.

42. The system of claim 41, wherein the slot is positioned substantially in line with a line of impact of the striker.

* * * * *